US010630478B1

(12) United States Patent
Yavuz

(10) Patent No.: US 10,630,478 B1
(45) Date of Patent: Apr. 21, 2020

(54) SENDER OPTIMAL, BREACH-RESILIENT, AND POST-QUANTUM SECURE CRYPTOGRAPHIC METHODS AND SYSTEMS FOR DIGITAL AUDITING

(71) Applicant: University of South Florida, Tampa, FL (US)

(72) Inventor: Attila Altay Yavuz, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/235,412

(22) Filed: Dec. 28, 2018

(51) Int. Cl.
| | |
|---|---|
| *H04L 9/00* | (2006.01) |
| *G06F 21/00* | (2013.01) |
| *H04L 9/32* | (2006.01) |
| *H04L 9/08* | (2006.01) |
| *G06N 10/00* | (2019.01) |
| *G06F 21/60* | (2013.01) |

(52) U.S. Cl.
CPC ............ *H04L 9/321* (2013.01); *G06F 21/602* (2013.01); *G06N 10/00* (2019.01); *H04L 9/083* (2013.01); *H04L 9/0852* (2013.01)

(58) Field of Classification Search
CPC ....... H04L 9/321; H04L 9/0852; H04L 9/083; G06N 10/00; G06F 21/602
See application file for complete search history.

(56) References Cited

U.S. PATENT DOCUMENTS 6,895,091 B1    5/2005  Elliott et al.
7,376,835 B2    5/2008  Olkin et al.
8,396,222 B2    3/2013  Solow et al.
(Continued)

FOREIGN PATENT DOCUMENTS

CN    107124272 A    9/2017

OTHER PUBLICATIONS

M. Pivk, C. Kollmitzer and S. Rass, "SSL/TLS with Quantum Cryptography," 2009 Third International Conference on Quantum, Nano and Micro Technologies, Cancun, 2009, pp. 96-101. (Year: 2009).*

(Continued)

*Primary Examiner* — Alexander Lagor
(74) *Attorney, Agent, or Firm* — Meunier Carlin & Curfman LLC

(57) ABSTRACT

Cryptographic techniques referred to as Sender Optimal, Breach-resilient Auditing with Post-Quantum security (SO-BAP) are described. Optimal efficiency and post-quantum security of symmetric key based techniques are achieved, while providing compromise-resiliency, conditional non-repudiation, and fault-tolerance verification in a distributed setting. SOBAP relies on any choice of a symmetric key based primitive with extended features (e.g., forward-security, append-only authentication), which can be optimally efficient. The verification is done via the execution of symmetric primitive F with a secure multi-party computation (SMPC) technique, wherein an honest majority guarantees a conditional non-repudiation and fault-tolerance. SOBAP offers an architecture that uses authenticated access control data structures to ensure policy enforcement. SOBAP also offers a post-quantum security via symmetric primitives and SMPC. Extensions of SOBAP offer oblivious access and enhancements with secure hardware support.

20 Claims, 6 Drawing Sheets

(56) References Cited

U.S. PATENT DOCUMENTS

| | | | |
|---|---|---|---|
| 10,063,374 | B2 | 8/2018 | Bamasag et al. |
| 2017/0250816 | A1* | 8/2017 | Popa ..................... H04L 9/3247 |
| 2018/0181768 | A1* | 6/2018 | Leporini ............. G06F 21/6209 |
| 2019/0014100 | A1* | 1/2019 | Scott ..................... H04L 9/3236 |

OTHER PUBLICATIONS

Shundong, L., Daoshun, W., Yiqi, D., & Ping, L. (2008). Symmetric cryptographic solution to Yao's millionaires' problem and an evaluation of secure multiparty computations. Information Sciences, 178(1), 244-255. (Year: 2008).*

Abdalla, et al., A new forward-secure digital signature scheme. In Advances in Crpytology (ASIACRYPT '00), pp. 116-129. Springer-Verlag, 2000.

Accorsi. Log data as digital evidence: What secure logging protocols have to offer? In International Computer Software and Applications Conference (COMPSAC '09), pp. 398-403, 2009.

Bellare, et al., Authenticated encryption: Relations among notions and analysis of the generic composition paradigm. Journal of Cryptology, 21(4):469-491, Oct. 2008.

Bellare, et al., Introduction to modern cryptography. In UCSD CSE Course, p. 207. 1st edition, 2005. http://www.cs.ucsd.edu/~mihir/cse207/classnotes.html.

Bellare, et al., Random oracles are practical: A paradigm for de-signing efficient protocols. In Proceedings of the 1st ACM conference on Computer and Communications Security (CCS '93), pp. 62-73, NY, USA, 1993. ACM.

Bernstein, et al., Post Quantum Cryptography. Springer Publishing Company, Incorporated, 1st edition, 2008.

Bernstein, et al., SPHINCS: Practical stateless hash-based signatures. In Advances in Cryptology—EUROCRYPT 2015: 34th Annual International Conference on the Theory and Applications of Cryptographic Techniques, pp. 368-397. Springer Berlin Heidelberg, 2015.

Boneh, et al., Short signatures from the Weil Pairing. In Colin Boyd, editor, Advances in Cryptolog—ASIACRYPT 2001, pp. 514-532. Springer Berlin Heidelberg, 2001.

Bos, et al., Post-quantum key exchange for the tls protocol from the ring learning with errors problem. In 2015 IEEE Symposium on Security and Privacy, pp. 553-570, May 2015.

Bos, et at., Frodo: Take off the ring! practical, quantum-secure key exchange from lwe. In Proceedings of the 2016 ACM SIGSAC Conference on Computer and Communications Security, CCS '16, pp. 1006-1018, New York, NY, USA, 2016. ACM.

Brasser, et al., Software Grand Exposure: SGX Cache Attacks Are Practical, 2017, 12 pages.

Buchmann, et al., Xmss—a practical forward secure signature scheme based on minimal security assumptions. In Proceedings of the 4th International Conference on Post-Quantum Cryptography, PQCrypto' 11, pp. 117-129, Berlin, Heidelberg, 2011. Springer-Verlag.

Bulck, et al., Telling Your Secrets without Page Faults: Stealthy Page Table-Based Attacks on Enclaved Execution. In USENIX Security, 2017.

Chong, et al., Secure audit logging with tamper-resistant hardware. In Proceedings of the 18th IFIP International Information Security Conference, pp. 73-84. Kluwer Academic Publishers, 2003.

Cronin, et al., On the performance, feasibility, and use of forward-secure signatures. In Proceedings of the 10th ACM Conference on Computer and Communications Security (CCS '03), pp. 131-144. ACM, 2003.

Crosby, et al., Efficient data structures for tamper evident logging. In Proceedings of the 18th conference on USENIX Security Symposium, Aug. 2009.

Davis, et al., Time-scoped searching of encrypted audit logs. In Proc. of the 6th International Conference on Information and Communica-tions Security (ICICS '04), pp. 532-545, 2004.

Derler, et al., Post-Quantum Zero-Knowledge Proofs for Accumulators with Applications to Ring Signatures from Symmetric-Key Primitives., first published 2017 in PQCrypto. PQCrypto 2018, LNCS 10786, pp. 419-440, 2018.

Etemad, et al., Database outsourcing with hierarchical authenticated data structures. In Information Security and Cryptology—ICISC 2013, Lecture Notes in Computer Science, pp. 381-399. Springer International Publishing, 2014.

Fletcher, et al., A secure processor architecture for encrypted computation on untrusted programs. In Proceedings of the seventh ACM workshop on Scalable trusted computing, pp. 3-8. ACM, 2012.

Hoang, et al., S3ORAM: A computation-efficient and constant client bandwidth blowup ORAM with shamir secret sharing. In Proceedings of the 2017 ACM SIGSAC Conference on Computer and Communications Security, CCS 2017, Dallas, TX, USA, Oct. 30-Nov. 3, 2017, pp. 491-505, 2017.

Holt. Logcrypt: Forward security and public verification for secure audit logs. In Proc. of the 4th Australasian workshops on Grid computing and e-research (ACSW '06), pp. 203-211, 2006.

Intel Corporation. Intel Software Guard Extensions Programming Reference (rev2), Oct. 2014.

Jakobsson. Fractal hash sequence representation and traversal. In Proceedings of the 2002 IEEE International Symposium on Information Theory (ISIT '02), pp. 437-444. IEEE, 2002.

Lee, et al., Hacking in darkness: Return-oriented programming against secure enclaves. In USENIX Security, pp. 523-539, 2017.

Lee, et al., Inferring Fine-grained Control Flow Inside SGX Enclaves with Branch Shadowing. In USENIX Security, 2017.

Lily Chen. Nist special publication 800-108: Recommendation for key derivation using pseudorandom functions (revised). Technical Report NIST-SP800-108, National Institute of Standards and Technology. Computer Security Division, Oct. 2009. Available at http://csrc.nist.gov/publications/nistpubs/800-108/sp800-108.pdf.

Lyubashevsky V. Lattice signatures without trapdoors. In David Pointcheval and Thomas Johansson, editors, Advances in Cryptology—EUROCRYPT 2012, pp. 738-755, Berlin, Heidelberg, 2012. Springer Berlin Heidelberg.

Ma, et al., A new approach to secure logging. ACM Transactions on Storage (TOS), 5(1):1-21, 2009.

Ma, et al., A new approach to secure logging. In Proc. of the 22nd Annual IFIP WG 11.3 Working Conference on Data and Applications Security (DBSEC '08), pp. 48-63, 2008.

Ma, et al., Forward-secure sequential aggregate authentication. In Proceedings of the 28th IEEE Symposium on Security and Privacy (S&P '07), pp. 86-91, May 2007.

Ma. Practical forward secure sequential aggregate signatures. In Proceedings of the 3rd ACM symposium on Information, Computer and Communications Security (ASIACCS '08), pp. 341-352, NY, USA, 2008. ACM.

McKeen, et al., Intel® software guard extensions (intel® sgx) support for dynamic memory management inside an enclave. In Proceedings of the Hardware and Architectural Support for Security and Privacy 2016, p. 10. ACM, 2016.

Merkle. Protocols for public key cryptosystems. In Proceedings of the IEEE Symposium on Research in Security and Privacy, Apr. 1980.

Naor, et al.., Distributed pseudo-random func-tions and kdcs. In Jacques Stern, editor, Advances in Cryptology—EUROCRYPT '99, pp. 327-346, Berlin, Heidelberg, 1999. Springer Berlin Heidelberg.

National Institute of Standard Technologies (NIST). Submission requirements and evaluation criteria for the post-quantum cryptography standardization process. https://csrc.nist.gov/csrc/media/projects/post-quantum-cryptography/documents/call-for-proposals-final-dec-2016.pdf, Accessed: Oct. 11, 2017.

NIST. Announcing the advanced encryption standard (AES). FIPS 197, Nov. 2001.

Schneier, et al., Cryptographic support for secure logs on untrusted machines. In Proc. of the 7th conference on USENIX Security Symposium. USENIX Association, 1998.

Schneier, et al., Secure audit logs to support computer forensics. ACM Transactions on Information System Security, 2(2):159-176, 1999.

(56) References Cited

OTHER PUBLICATIONS

Shashank Agrawal, Payman Mohassel, Pratyay Mukherjee, and Peter Rindal. Dise: Distributed symmetric-key encryption. IACR Cryptology ePrint Archive, 2018:727, 2018.
Shweta Agrawal and Dan Boneh. Homomorphic macs: Mac-based integrity for network coding. In Proceedings of the 7th International Conference on Applied Cryptography and Network Security, ACNS '09, pp. 292-305, Berlin, Heidelberg, 2009. Springer-Verlag.
Stefanov, et al., Towards practical oblivious ram. In 19th Annual Network and Distributed System Security Symposium, (NDSS), 2012, 40 pages.
Yavuz, et al., BAF and FI-BAF: Efficient and publicly verifiable cryptographic schemes for secure logging in resource-constrained systems. ACM Transactions on Information System Security, 15(2), 28 pages, 2012.
Yavuz, et al., BAF: An efficient publicly verifiable secure audit logging scheme for distributed systems. In Proceedings of 25th Annual Computer Security Applications Conference (ACSAC '09), pp. 219-228, 2009.
Yavuz, et al., Self-sustaining, efficient and forward-secure cryptographic constructions for unattended wireless sensor networks. Ad Hoc Networks, 10(7):1204-1220, 2012.

* cited by examiner

Algorithm 1 A Symmetric Primitive with Extended Properties at the Signer-Side for SOBAP 205: $(\vec{C}_{1,m}, \sigma_{1,m}, k_j^{L+1}) \leftarrow F^{ID_j}((\vec{C}_{1,m-1}, M_m), \sigma_{1,m-1}, M_m, k_j^L)$:

210: 1: $\vec{C}_m \leftarrow E_{k_j^L}(M_m)$.

220: 2: $\sigma_{1,m} \leftarrow SymAuth((\vec{C}_{1,m-1}, C_m), k_j^L)$.

230: 3: $k_j^{L+1} \leftarrow Upd(k_j^L)$.

200

300

Algorithm 2 A Symmetric Primitive with Extended Properties for Single-Party Verification in SOBAP 405 — $(b, \vec{M}_{1,m}) \leftarrow F^{Ver}(\vec{C}_{1,m}, \sigma_{1,m}, ID_i, \vec{msk})$ 410 — 1: $k_i^1 \leftarrow KDF_{\vec{msk}}(ID_i)$.

420 — 2: $k_i^j \leftarrow Upd(k_i^{j-1}), j = 2, \ldots, L$, where all keys are kept in memory for the next step.

430 — 3: $b \leftarrow SymAuth(\vec{C}_{1,m}, (k_i^1, \ldots, k_i^L))$. If $b = 0$ then it *aborts* and return $\vec{M}_{1,m} \leftarrow null$. Otherwise, it continues as follows.

440 — 4: $M_j \leftarrow D_{k_i^j}(C_j), j = 1, \ldots, L$, where $\vec{M}_{1,m} = (M_1, \ldots, M_L)$.

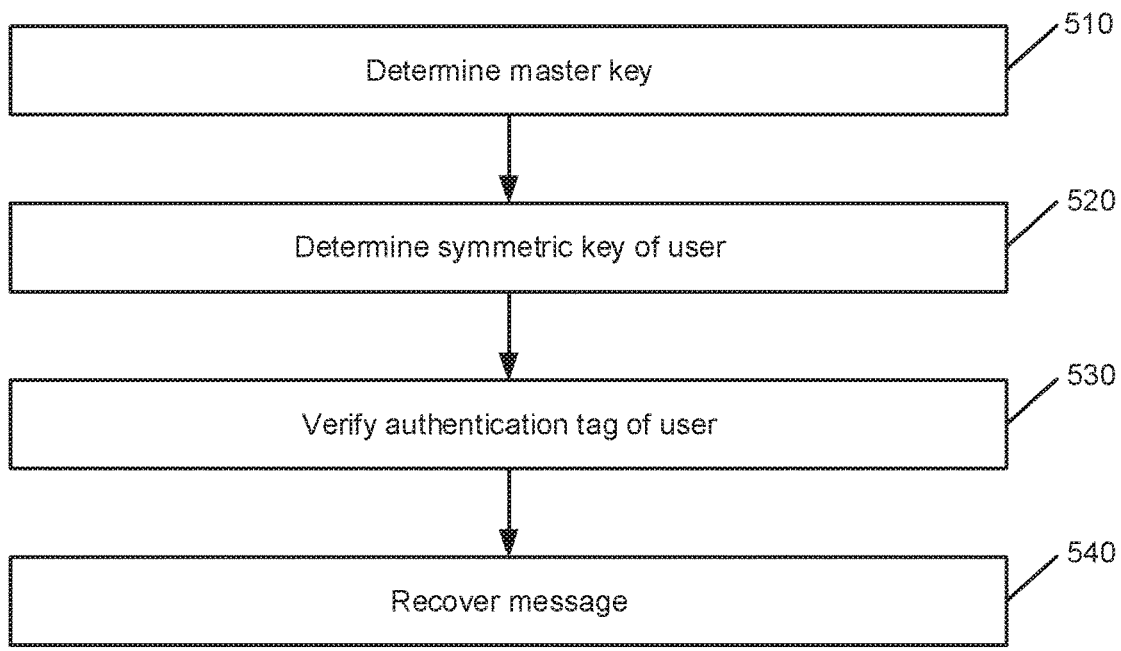

Algorithm 3 Distributed Execution of $F^{Ver}$ in SOBAP

605 — $(b, \vec{M}_{1,m}) \leftarrow SMPC((F_{P_1}^{Ver}, msk_1), \ldots, (F_{P_n}^{Ver}, msk_n))$

Algorithm 4

710 — 1: Given users $(ID_1, \ldots, ID_z)$, auditors $(A_1, \ldots, A_e)$ and their corresponding access control policy information, the KGC creates *AACDS* and provides it to the cloud server.

720 — 2: Given the security parameter $\kappa$, KGC creates a master key set $\overrightarrow{msk} = \{msk_j \leftarrow \{0,1\}^\kappa\}_{j=1}^n$.

730 — 3: KGC derives $k_j^1 \leftarrow KDF_{\overrightarrow{msk}}(ID_i)$ and gives it to user $ID_i$ along with function $F^{ID_i}$ for $i = 1, \ldots, z$.

740 — 4: Given function $F^{Ver}$, KGC generates $((F_{P_1}^{Ver}, msk_1), \ldots, (F_{P_n}^{Ver}, msk_n))$ and distributes them to the parties $(P_1, \ldots, P_n)$, respectively.

742 — *Sender*: The user $ID_i$ cryptographically protects the data collected in time periods $(t_1, \ldots, t_L)$ via function $F^{ID_i}$ as $(\overrightarrow{C}_{1,m}, \sigma_{1,m}, k_j^{L+1}) \leftarrow F^{ID_i}((\overrightarrow{C}_{1,m-1}, M_m), \sigma_{1,m-1}, M_m, k_j^L)$, where $M_m$ is the last data set collected in $t_L$. The user $ID_i$ uploads $(\overrightarrow{C}_{1,m}, \sigma_{1,m})$ to the cloud server.

745 — *Audit and Verification*: An auditor $A$ requests the verification and/or decryption of cryptographically protected data $(\overrightarrow{C}_{1,m}, \sigma_{1,m})$ of user $ID_i$.

750 — 5: $A$ sends his request to all verification parties $(P_1, \ldots, P_n)$.

760 — 6: Each part $P_i$ accesses *AACDS* on the cloud server, and cryptographically verifies if $A$ has required access rights on the data of user $ID_i$. If $A$ does not have access rights, at least one verification party *aborts*. Otherwise, they execute the distributed verification function $F^{Ver}$ by fetching the cryptographically protected data from the cloud server and communicating with each other as follows:

770 —
780 —

- $(b, \overrightarrow{M}_{1,m}) \leftarrow SMPC((F_{P_1}^{Ver}, msk_1), \ldots, (F_{P_n}^{Ver}, msk_n))$.
- If bit $b = 0$, then parties inform $A$ that the data is not authenticated, and they *abort*. Otherwise, they provide $\overrightarrow{M}_{1,m}$ to $A$ over a post-quantum secure channel.

SENDER OPTIMAL, BREACH-RESILIENT, AND POST-QUANTUM SECURE CRYPTOGRAPHIC METHODS AND SYSTEMS FOR DIGITAL AUDITING

CROSS REFERENCE TO RELATED APPLICATIONS

None.

STATEMENT REGARDING FEDERALLY SPONSORED RESEARCH

None.

FIELD

The disclosure generally relates to methods and systems for cryptographic auditing schemes that are sender optimal, breach-resilient, and post-quantum secure.

BACKGROUND

Internet of Things (IoT) is a large-ubiquitous system that includes vast quantities of connected smart-objects (e.g., sensors, actuators). It is a crucial requirement to ensure the cyber-security of IoTs to permit their deployment in real-life applications. Key exchange and management is a foundation security service for IoTs, since it enables the distribution of cryptographic keys in IoT devices.

With IoT, low-end devices such as medical implantables, wearable devices, and various sensors generate large amounts of highly sensitive data (e.g., medical, financial and forensic) that are maintained and audited by cloud services. It is important to ensure the security of sensitive data, wherein such IoT devices and cloud systems are under the threat of active adversaries with improved capabilities (e.g., quantum computing). One may consider using breach-resilient public key based cryptographic techniques with post-quantum security (e.g., lattice-based forward secure signature and encryption) to achieve scalable services with non-repudiation property. However, these techniques are extremely costly and currently impractical for IoT devices. Hence, there is a significant need for developing cryptographic mechanisms with extended properties that can achieve scalability and non-repudiation in a highly efficient manner.

There are two main lines of cryptographic protection techniques.

Symmetric Cryptography Based Primitives:

In one line, several symmetric cryptography based audit techniques have been proposed [19, 22, 34, 43, 44]. These techniques mainly rely on Message Authentication Codes [7], hash chains [29], and Merkle-hash trees [39]. A common system architecture in these schemes is that, the sender (a.k.a., the signer and/or encryptor) share a symmetric key with a trusted server, and uploads cryptographically secure audit logs to this trusted server. This server acts as an auditor and verifies the authenticity of log entries by using the secret keys shared with the senders.

Many of these techniques are near-optimal efficient in terms of computation and communication overhead due to their reliance on highly efficient symmetric primitives. Some of these techniques also achieve sender-side compromise resiliency via an implementation of forward-secure symmetric MACs with hash-chains [34]. Some of these techniques can also offer "all-or-nothing" features, wherein an adversary cannot selectively delete log entries from a log trail without being detected. Moreover, these techniques can achieve a post-quantum security, since they rely on symmetric primitives [1].

However, the symmetric cryptography based techniques have the following drawbacks: (i) They cannot achieve non-repudiation and public verifiability, since the verifier shares the same key with senders. That is, the verifier can easily generate an authentication tag on behalf of any sender of its choice, since it has all the shared keys. The lack of non-repudiation is a significant drawback for many applications (e.g., healthcare, financial, and lawsuits) that need a dispute resolution mechanism. Non-repudiation also alleviates the liability on verifiers, since they cannot be accused of creating fake authentication tags. (ii) The direct application of these techniques to auditing might create vulnerabilities against active adversaries. Specifically, if the verifier is compromised by an active adversary (e.g., a malware or insider collusion), the security of all senders, with whom the verifier shares symmetric keys, are also compromised. (iii) The symmetric key based methods are not scalable for large-distributed systems. Therefore, these techniques are generally coupled with Public Key Cryptography (PKC) for key distribution, management, and authentication purposes.

Public Key Cryptography Based Primitives:

In another line, public key cryptography based auditing techniques have been proposed (e.g., [3, 23, 27, 35, 36, 46, 48]). These schemes are mainly based on digital signatures [7], which can guarantee public verifiability and non-repudiation properties. Moreover, because they rely on public keys for verification, they by default achieve verifier compromise resiliency and availability (anybody can verify the logs without relying on a trusted party). Many of these schemes (e.g., [33]) either adapt or create new forward-secure (e.g., [2]) and/or aggregate signature schemes [12] to offer sender-side compromise-resiliency and compactness. The signature aggregation offers an added benefit of append-only feature, wherein one can only add to a trail of audit logs, but cannot selectively delete from it without being detected. There are also recently emerging PKC schemes with post-quantum security assurances for broader use cases, which include encryption and digital signatures (e.g., [9, 13, 14, 42].

Despite their merits, public key based techniques have the following drawbacks: (i) All these techniques rely on highly costly operations such as exponentiations, cryptographic pairing, and elliptic curve scalar multiplications for per item to be signed or verified. While some schemes are efficient for either sender or verifier side, in general they are several orders of magnitude costlier than their symmetric key counterparts. (ii) Their key and signature sizes are significantly larger than that of symmetric cryptography based counterparts. (iii) All these alternatives rely on either factorization based or discrete logarithm based primitives, and therefore cannot offer a post-quantum security. (iv) A potential post-quantum secure variants of such forward-secure and/or aggregate schemes are potentially even more costly in terms of key and signature sizes than their traditional counterparts.

There is a need to have sender optimal (symmetric) cryptographic schemes that are compromise-resilient, compact, post-quantum secure, and achieve non-repudiation and breach-resiliency at the verifier side.

SUMMARY

This disclosure describes cryptographic techniques referred to as Sender Optimal, Breach-resilient Auditing with Post-Quantum security (SOBAP). Optimal efficiency and post-quantum security of symmetric key based techniques are achieved, while providing compromise-resiliency, conditional non-repudiation, and fault-tolerance verification in a distributed setting. That is, SOBAP relies on any choice of a symmetric key based primitive with extended features (e.g., forward-security, append-only authentication), which can be optimally efficient. The verification is done via the execution of symmetric primitive F with a secure multi-party computation (SMPC) technique, wherein an honest majority guarantees a conditional non-repudiation and fault-tolerance. SOBAP offers an architecture that uses authenticated access control data structures to ensure policy enforcement. SOBAP also offers a post-quantum security via symmetric primitives and SMPC. Extensions of SOBAP offer oblivious access and enhancements with secure hardware support.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

FIG. 4 is an algorithmic diagram of an implementation of a technique for a symmetric primitive with extended properties for single party verification in SOBAP.

FIG. 5 is an operational flow of an implementation of a method for a symmetric primitive with extended properties for single party verification in SOBAP.

FIG. 6 is an algorithmic diagram of an implementation of a technique for distributed execution of symmetric primitives with extended properties in SOBAP.

FIG. 7 is an algorithmic diagram and operational flow of an implementation of a SOBAP technique.

DETAILED DESCRIPTION

Figure 1:
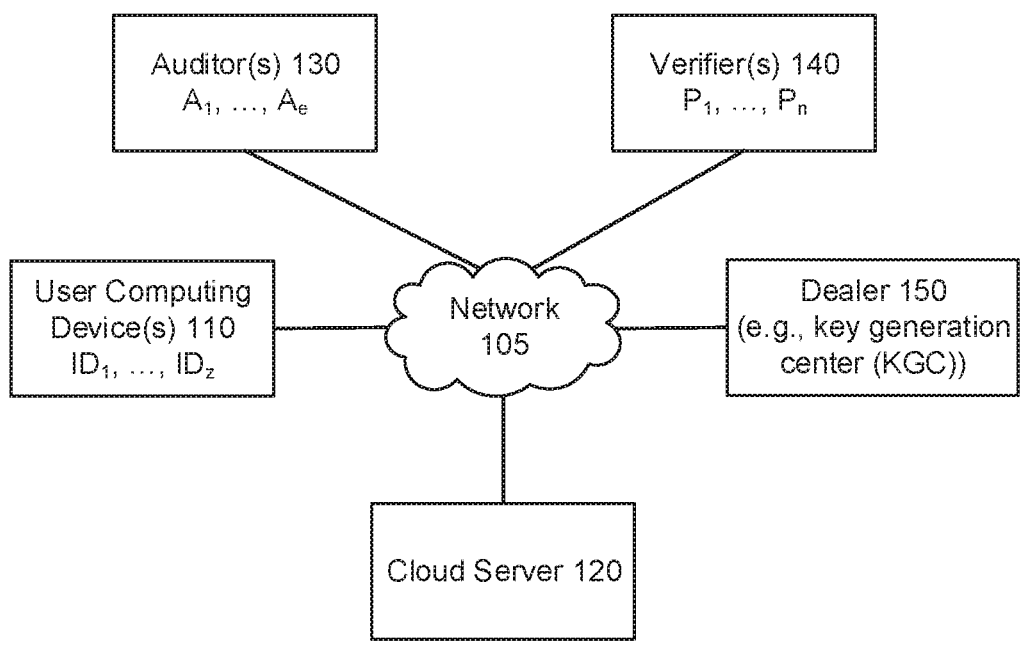
FIG. 1 is an illustration of an exemplary environment for implementing Sender Optimal, Breach-resilient Auditing with Post-Quantum security (SOBAP) techniques.

The following description of the disclosure is provided as an enabling teaching of the disclosure in its best, currently known embodiment(s). To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Unless defined otherwise, all technical and scientific terms used herein have the same meaning as commonly understood to one of ordinary skill in the art to which this invention belongs. As used in the specification and claims, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur. Publications cited herein are hereby specifically incorporated by reference in their entireties and at least for the material for which they are cited.

In modern Internet of Things (IoT) systems, large quantities of resource-limited devices are used to collect, process, and transmit highly sensitive information for privacy and safety critical applications. For example, medical gadgets such as medical implantables, wearables, and handheld devices gather, process, and upload highly sensitive healthcare information to the cloud servers. In smart-infrastructures such as smart-grid, smart-city, or military installations, various sensors are used to collect and analyze information from safety critical cyber-infrastructures. It is vital for all these applications that the sensitive information collected by these resource-limited IoT devices are cryptographically protected. It is also necessary to ensure the scalability, availability, and high performance of these applications while guaranteeing a cryptographic protection. Finally, with the emergence of quantum computers, it is also important to offer post-quantum security for long-term security of these applications.

Several cryptographic primitives have been proposed to offer basic cyber-security services such as authentication, integrity, and confidentiality. In addition to these basic cryptographic services, emerging IoTs also need advanced security features such as breach-resiliency (e.g., compromise-resiliency), fault-tolerance, and availability. For example, given increased attack surface, an active adversary may compromise sensors and gadgets deployed in the field, and recover not only sensitive data but also the cryptographic keying material that were used to protect the information. Similarly, via insiders and/or malware infiltration, the cloud server side of IoT systems is also frequently breached. Moreover, due to a failure or adversarial intervention, the auditing and other services analyzing and controlling the data might be interrupted. Hence, an ideal cryptographic protection mechanism achieves high efficiency, breach-resiliency, fault-tolerance, scalability, post-quantum security, and non-repudiation properties simultaneously. Existing symmetric and asymmetric cryptographic techniques do not achieve all these goals at the same time.

The techniques, systems, and methods described herein create sender optimal (symmetric) cryptographic schemes that are compromise-resilient, compact, post-quantum secure, and achieve some non-repudiation and breach-resiliency at the verifier side. That is, optimal symmetric cryptography efficiency and security is achieved, while ensuring some level of compromise-resiliency, distributed (conditional) non-repudiation, and fault-tolerance for verification.

Features of Sender Optimal, Breach-resilient Auditing with Post-Quantum security (SOBAP) include the following.

SOBAP achieves authenticity, integrity, and confidentiality of sensitive data while ensuring forward security, thereby providing compromise-resiliency at the sender side. That is, even if an active adversary compromises the sender device and cryptographic keys in it, the adversary cannot forge authentication tags or decrypt data generated before the attack occurs.

SOBAP provides compromise-resiliency and fault-tolerance at the verifier side. SOBAP guarantees each verifier possesses only a part of the sender's key. Unless an active adversary compromises a majority (or all) of verifiers, a partially (minority) compromised set of verifiers do not help an adversary to forge an authenticated tag and/or decrypt sensitive data.

Moreover, the verification of SOBAP can be based on secure multi-party computation techniques that have some tolerance against malicious or missing input from verifiers. This permits a resiliency against persistent active adversaries (e.g., who may inject malicious input) or unexpected system failures (lack of response due to a down server or network).

SOBAP also provides efficiency. It is desirable for a cryptographic protection mechanism to incur a minimum computational, communication, and transmission overhead on users (senders) and verifiers. It is desirable to ensure the efficiency for sender devices, which might be a low-end device with resource-limitations (e.g., medical implantable, payment device, IoT sensor). In SOBAP, the sender executes a symmetric primitive of choice F with extended properties, which can be optimally efficient. No additional operation and/or storage and/or communication overhead is necessary beyond F for senders, which makes SOBAP a sender optimal cryptographic protection scheme. Verifier parties execute F in a distributed setting via a proper secure multi-party computation technique. Such techniques can be highly efficient in a semi-honest model, and also efficient in some malicious settings, especially if high communication bandwidth is available among verifiers.

SOBAP provides a conditional non-repudiation in the distributed setting, meaning that unless some (or all) the verifier parties collude, they cannot generate an authentication tag or ciphertext on behalf of the sender. This is not only a non-repudiation but also a verifier side compromise resiliency feature. Additionally, SOBAP provides a post-quantum security and conditional non-repudiation at the same time.

As described further herein, an implementation of SOBAP comprises an architecture that permits authenticated access control and auditing for users, verifiers, and auditors. The architecture can be useful for a broad set of applications such as digital forensic auditing, medical analytics and diagnosis, insurance systems, and other applications that require highly sensitive data to be accessed and verified only by valid parties in a secure and efficient manner.

Operators ∥ and |x| denote the concatenation and the bit length of variable x, respectively $x \leftarrow^\$ -S$ means variable x is randomly and uniformly selected from set S. For any integer 1, $(x0, \ldots x1) \leftarrow^\$ -S$ means $(x0x \leftarrow^\$ -S, \ldots x1 \leftarrow^\$ -S)$. |S| denotes the cardinality of set S. $\{0,1\}^*$ is the set of binary strings of any finite length. The set of items $q_i$ for $i=0, \ldots$ $1-1$ is denoted by $\{qi\}$ from $i=0$ to $1-1$. Log x means log base 2 of x. H denotes a cryptographic hash function.

The following cryptographic primitives may be used with SOBAP, as described further herein.

Pseudo Random Functions (PRFs) are efficient and deterministic functions which return pseudorandom output indistinguishable from random sequences. Given an input M and a private key k, output $s \leftarrow PRF_k(M)$ should be indistinguishable from random uniform outputs of a Random Oracle (RO) [6]. PRFs are fundamental building blocks for symmetric key cryptography, and they are used to construct many primitives, including but not limited to, symmetric encryption [41], hash functions, Message Authentication Codes (MACs) [5], and Key Derivation Functions (KDF) [18].

A message authentication code (MAC) [38] may be used, where s F $MAC_k(M)$ denotes the message authentication code s computed on message M with private key k.

Symmetric Encryption may be used. In an implementation, IND-CPA secure [7] symmetric cipher (E, D) is used. That is, given a symmetric key k, $c \leftarrow E_k(M)$ is encrypting plaintext M with key k, and $M \leftarrow D_k(c)$ is decrypting ciphertext c with key k.

Key-evolving techniques offer forward-security (e.g., [21]), where the current keying material $sk^j$ is updated to $sk^{j+1}$ with a one-way function, and then $sk^j$ is deleted from the memory. This operation is referred to as update function $sk^{j+1} \leftarrow Upd(k^j)$. For example, given key $k^j$, one can evolve (update) it as $j^{j+1} \leftarrow H(k^j)$, and then delete $k^j$. Even if $k^{j+1}$ is compromised, the adversary cannot compute $k^j$ from $k^{j+1}$ (recall that H is one-way and collusion-free). Hence, any function computed with $k^j$ and keys before it cannot be computed by the attacker.

In some implementations, a series for symmetric key based primitives is used that can achieve extended properties such as forward-secure encryption and authentication [47], Authenticated Encryption (AE) [8], encryption-then-authenticate, forward-secure and aggregate authentication [34], or any other combination of such primitives with different features. Such a function may be referred to as $$\sigma_{1,m} \leftarrow SymAuth(\langle \vec{C}_{1,m-1}, C_m \rangle, k_i^L)$$

where SymAuth takes a set of ciphertext and current state of private key $k_i^L$ as input, and produces an authentication tag on them as $\sigma_{1,m}$.

A choice of such symmetric primitive with extended features, which uses a collection of (E, D), Upd, and SymAuth is denoted as $x \leftarrow F(., k)$, where the input is a message (e.g., combination of ciphertext and/or plaintext vector) and a cryptographic key k. It produces an output y (a ciphertext and/or an authenticated tag). Choices of F for SOBAP are described further herein. An execution of function F in secure multi-party computation model is also described below.

For Secure Multi-Party Computation (SMPC), let a participant in a distributed system be $P_1, \ldots, P_n$. Each participant $P_i$ holds a secret input $x_i$, and the participants agree on some function F that takes n inputs. Their goal is to compute $y \leftarrow F(x_1, \ldots, x_n)$ while making sure that the following two conditions are satisfied: (i) correctness: the correct value of y is computed; and (ii) privacy: y is the only new information that is released. Computing F such that privacy and correctness are achieved is referred to as computing F securely. One may consider a more general case where each party gets its own private output. Reference [20] provides details of generic SMPC methods.

In SOBAP implementations, Distributed PRFs (DPRF) [40] may be used in general and their recent efficient instantiations such as Distributed Symmetric-key Encryption (DiSE) [4] in specific. The efficient executions of symmetric primitives may be considered with extended properties F via a proper SMPC technique, denoted as $y \leftarrow SMPC(F, P_1, \ldots, P_n)$. These executions may consider a semi-honest or a malicious model depending on the security and performance requirements of the applications.

SOBAP uses an access control mechanism that enforces access control policies over the sensitive data (e.g., keying material, audit logs) for the system participants. Any access control mechanism (e.g., Role-based Access Control, Mandatory Access Control [11]) uses an Access Control Data Structure (ACDS), in which relationships among system participants and their privileges of access rights over the data are maintained. In some implementations of SOBAP, ACDS is maintained via an Authentication Data Structure (ADS) (e.g., [24]). An ADS permits dynamic updates on a given data structure and ensures the authenticity and integrity of the items retrieved from it. This is referred to as Authenticated Access Control Data Structure (AACDS). Some of the tools of an AACDS include symmetric primitives (e.g., PRF), hash-based primitives (e.g., Merkle-hash trees), and digital signatures. One may choose hash-based digital signatures (e.g., [10, 16]) or lattice-based signatures (e.g., [32]) to ensure all building blocks of AACDS are post-quantum secure.

FIG. 1 is an illustration of an exemplary environment 100 for implementing cryptographic techniques within a network of entities. As described, the environment 100 and associated techniques retain optimal efficiency and post-quantum security of symmetric key cryptography at the sender side, while realizing the symmetric verification and/or decryption in a distributed setting, to achieve a conditional non-repudiation and compromise-resiliency at the verifier side. The approaches uses SMPC techniques to execute symmetric primitives with extended features such as compromise-resiliency, aggregation, all-or-nothing primitives, and authenticated encryption in a distributed setting at the verifier side. The environment 100 encapsulates users (e.g., user computing devices), auditors, cloud servers, and verifiers executing SMPC protocol in a cohesive way to ensure access control and functionality. SMPC techniques are used that can be realized in semi-honest or malicious settings.

The environment 100 comprises one or more user computing devices 110, a cloud server 120, one or more auditors 130, one or more verifiers 140, and a dealer 150.

The user computing device(s) 110 may comprise a resource-limited IoT device such as healthcare devices (e.g., medical implantables) or various type of sensors as well as mobile devices. The user computing device(s) 110 may generate sensitive data such as audit logs, system information, medical data, or similar digital assets that are to be cryptographically secured. The user computing device(s) 110 uploads its cryptographically protected data into the cloud server 120 to ensure its maintenance and ease of access by other valid entities. As used herein, the user computing device(s) 110 are denoted as $ID_1, \ldots, ID_z$, where z is an integer.

The cloud server 120 stores and maintains the data that is being uploaded by the user computing device(s) 110. The cloud server 120 can be accessed by the owner of data (i.e., the user computing device(s) 110) or other entities that can verify and/or audit this sensitive data. In some implementations, the entities who are responsible for the verification of data can also act as a distributed cloud server. The cloud server 120 is responsible for maintaining both the sensitive data and AACDS on it. All valid entities in the environment 100 can connect to the cloud server 120 via a secure channel, and access the required information (e.g., sensitive data, AACDS) depending on their privileges.

The auditor(s) 130 are responsible for auditing information uploaded by the user computing device(s) 110 for various type of services. One potential service is forensic investigation, wherein the auditor(s) 130 verify the authenticity and integrity of audit logs generated by the user computing device(s) 110. In another case, the auditor(s) 130 can monitor the sensitive data on behalf of data owners (i.e., the user computing device(s) 110) to offer services on it. For example, the auditor(s) 130 can comprise one or more doctors and/or one or more insurance companies, which can monitor and assess the medical data uploaded by the user computing device(s) 110 (e.g., medical devices comprising, or comprised within, the user computing device(s) 110). Proper policies and access control mechanisms are used to enforce a regulation for accessing the sensitive data among the user computing device(s) 110 and the auditor(s) 130. As used herein, the auditor(s) 130 are denoted as $A_1, \ldots, A_e$, where e may be an integer, and in some implementations e is smaller than the integer z used to denote the number of user computing device(s) 110.

The verifier(s) 140 may be denoted as $P_1, \ldots, P_n$, where n may be an integer, and in some implementations n is smaller the integer z used to denote the number of user computing device(s) 110. The verifier(s) 140 are responsible for the execution of symmetric primitives with extended features $F^{Ver}$ in a distributed setting via a proper SMPC protocol. Upon the request of the auditor(s) 130, the verifier(s) 140 check if the auditor(s) 130 have access privileges on the sensitive data of a given user $ID_i$ (via checking AACDS on the cloud server 120). If the auditor(s) 130 have valid access privileges, the verifier(s) 140 execute $F^{Ver}$ via SMPC, which permits them to authenticate and/or decrypt the sensitive information. If the sensitive data is verified (i.e., it is authenticated and preserves its integrity), the verifier(s) 140 provide this data to the valid auditor(s) 130.

The dealer 150, such as a key generation center (KGC), is a trusted entity that sets up the environment 100 at the initialization phase with the participation of the entities in the environment 100. The dealer 150 generates a set of master keys, from which individual private keys of the user computing device(s) 110 are derived. The dealer 150 also creates AACDS that will be used to regulate the access of the auditor(s) 130 on sensitive data of the user computing device(s) 110. Additionally, the dealer 150 creates and distributes SMPC components (e.g., pieces of master key, garbled circuits, pre-computed values) to the verifier(s) 140. In some implementations, if required, the dealer 150 may delete the sensitive keying information and data after this one-time initial setup phase.

Figure 8:
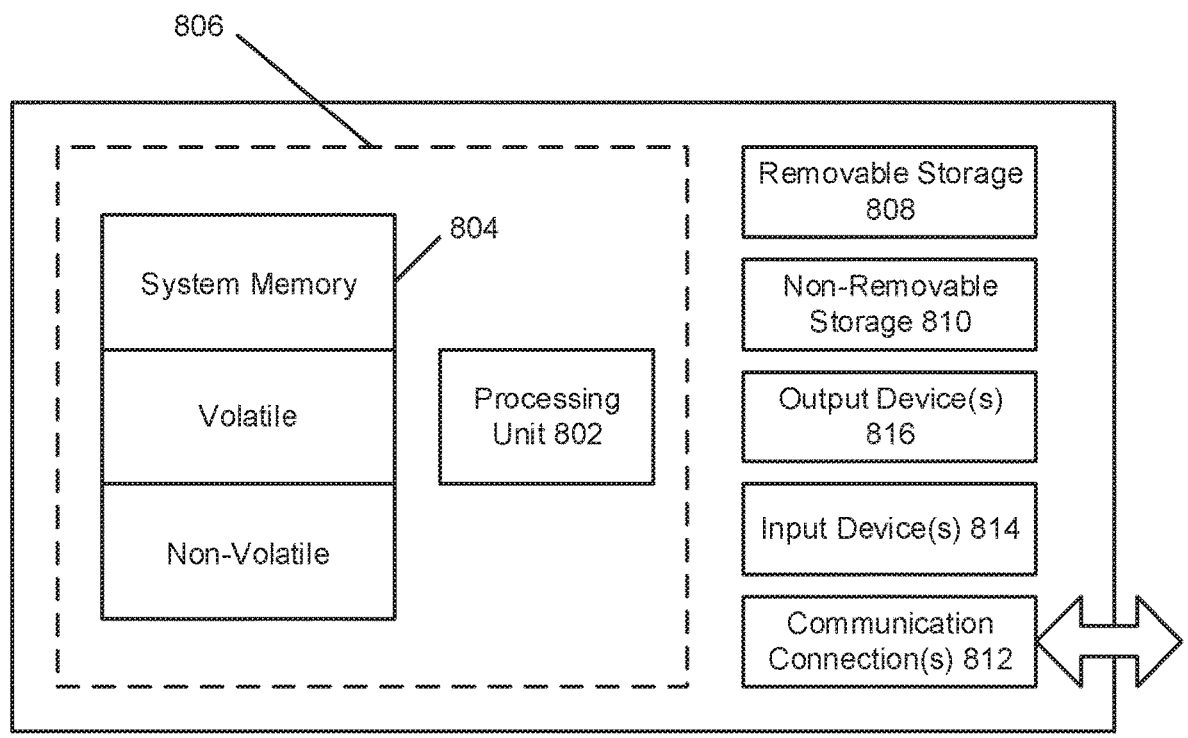
FIG. 8 shows an exemplary computing environment in which example embodiments and aspects may be implemented.

The descriptions of the one or more user computing device(s) 110, the cloud server 120, the auditor(s) 130, the verifier(s) 140, and the dealer 150 is not intended to be limiting. Each of the one or more user computing devices 110, the cloud server 120, the one or more auditors 130, the one or more verifiers 140, and the dealer 150 may be implemented using a variety of computing devices such as smartphones, desktop computers, laptop computers, tablets, digital media players, set top boxes, vehicle navigation systems, and video game consoles. Other types of computing devices may be supported. A suitable computing device is illustrated in FIG. 8 as the computing device 800.

As would be readily apparent to one of ordinary skill in the art, the one or more user computing devices 110, the cloud server 120, the one or more auditors 130, the one or more verifiers 140, and the dealer 150 may be implemented as programmed computers operating under control of computer program code. The computer program code would be stored in a computer readable medium (e.g., a memory) and the code would be executed by a processor of the computer.

The one or more user computing devices 110, the cloud server 120, the one or more auditors 130, the one or more verifiers 140, and the dealer 150 may be in communication with one another via a data network 105. The data network 105 may be a variety of network types including the public switched telephone network (PSTN), a cellular telephone network, and a packet switched network (e.g., the Internet).

Figures 2, 3:
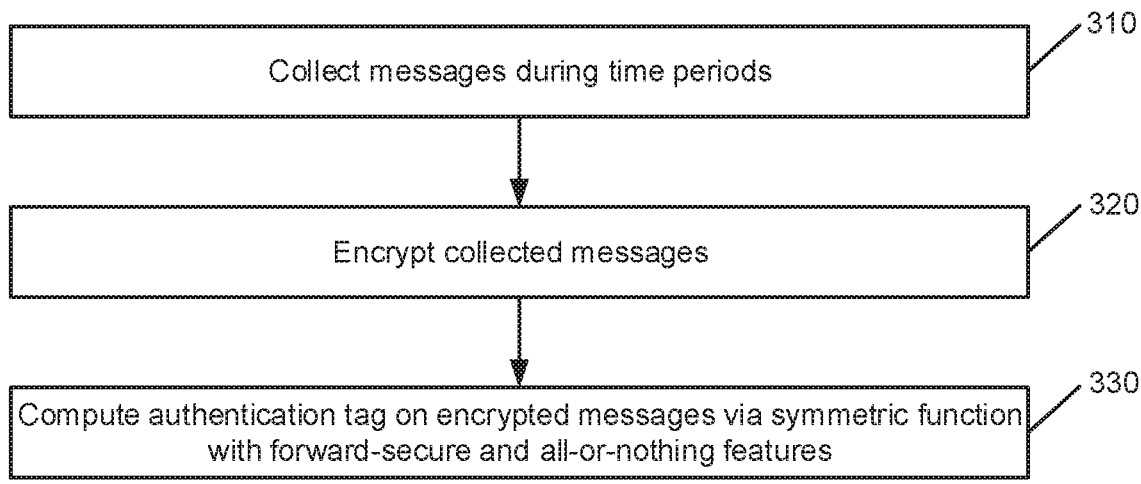
FIG. 2 is an algorithmic diagram of an implementation of a technique for a symmetric primitive with extended properties at the signer-side for SOBAP.
FIG. 3 is an operational flow of an implementation of a method for a symmetric primitive with extended properties at the signer-side for SOBAP.

FIG. 2 is an algorithmic diagram 200 of an implementation of a technique for a symmetric primitive with extended properties at the signer-side for SOBAP. FIG. 3 is an operational flow of an implementation of a method 300 for a symmetric primitive with extended properties at the signer-side for SOBAP.

In the algorithmic diagram 200 (also referred to in FIG. 2 as "Algorithm 1"), the symmetric primitive 205 $(\vec{C}_{1,m}, \sigma_{1,m}, k_i^{L+1}) \leftarrow F^{ID_i}(\langle \vec{C}_{1,m-1}, M_m \rangle, \sigma_{1,m-1}, M_m, k_i^L)$ acts as a function that encrypts a message.

Messages are collected during time periods at 310, encrypted at 320, and the authentication tags of the encrypted messages are respectively set at 330. More particularly, in an implementation, the authentication tag of user $ID_i$ on messages $\vec{M}_{1,m-1} = (M_1, \ldots, M_{m-1})$ collected (at 310) and encrypted (at 320) as $\vec{C}_{1,m-1} = (C_1, \ldots, C_{m-1})$ during time periods $t_1, \ldots, t_{L-1}$ is set to $\sigma_{1,m-1}$. Messages collected on time period $t_L$ are set to $M_m$. At 330, the authentication tag $\sigma_{1,m}$ on encrypted messages $\vec{C}_{1,m} = (C_1, \ldots, C_m)$ is computed via symmetric function $F^{ID}_i$ with forward-secure and all-or-nothing features as given by: $\vec{C}_m \leftarrow E_{k_i^L}(M_m)$, shown at 210, $\sigma_{1,m} \leftarrow \text{SymAuth}(\langle \vec{C}_{1,m-1}, C_m \rangle, k_i^L)$ shown at 220, and $k_i^{L+1} \leftarrow \text{Upd}(k_i^L)$ shown at 230.

FIG. 4 is an algorithmic diagram 400 of an implementation of a technique for a symmetric primitive with extended properties for single party verification in SOBAP. FIG. 5 is an operational flow of an implementation of a method 500 for a symmetric primitive with extended properties for single party verification in SOBAP. In the algorithmic diagram 400 (also referred to in FIG. 4 as "Algorithm 2"), the inputs that may be used are the outputs of Algorithm 1, and the function 405

$(b, \vec{M}_{1,m}) \leftarrow F_{Ver}(\vec{C}_{1,m}, \sigma_{1,m}, ID_i, \vec{msk})^i$ is a verification function for the symmetric primitive that will be implemented in SMPC settings.

A master key is determined at 510, and the symmetric key of a user is determined at 520. In an implementation, given a master key $\vec{msk}$, the symmetric key of user $ID_i$ is derived. At 530, the authentication tag of the user is verified. Thus, continuing with the example, $\sigma_{1,m}$ on $\vec{C}_{1,m}$ is verified. Upon verification, at 540, the message is recovered. Thus, in the example, if the authentication tag $\sigma_{1,m}$ on $\vec{C}_{1,m}$ is verified, then the plaintext $\vec{M}_{1,m}$ is recovered.

These operations are shown in FIG. 4 as $k_i^1 \leftarrow \text{KDF} \vec{msk}(ID_i)$ at 410; at 420, as $k_i^j \leftarrow \text{Upd}(k_i^{j-1})$, for $j=2, \ldots, L$, where all keys are kept in memory for the next operation 430; and $b \leftarrow \text{SymAuth}(C_{1,m}, \langle k_i^1, \ldots, k_i^L \rangle)$. If b=0, then the verification fails (i.e., it is not verified), and it aborts and returns $\vec{M}_{1,m} \leftarrow \text{null}$; otherwise (i.e., b=1 and thus it is verified), processing continues at 440. At 440, $M_j \leftarrow D_{k_i^j}(C_j)$, for $j=1, \ldots, L$, where $\vec{M}_{1,m} = (M_1, \ldots, M_L)$.

FIG. 6 is an algorithmic diagram 600 of an implementation of a technique for distributed execution of symmetric primitives with extended properties in SOBAP. The technique of FIG. 6 performs similarly to that of Algorithm 2 of FIG. 4, but in a distributed manner as it simulates Algorithm 2 across multiple parties.

More particularly, in the algorithmic diagram 600 (also referred to in FIG. 6 as "Algorithm 3"), the function 605 (b, $\vec{M}_{1,m}) \leftarrow \text{SMPC}(\langle F_{P_1}^{Ver}, msk_1 \rangle, \ldots, \langle F_{P_n}^{Ver}, msk_n \rangle)$ denotes a distributed execution of $F^{Ver}$ among verification parties $(P_1, \ldots, P_n)$. Each party $P_i$ is given a required component of $F^{Ver}$ as denoted by $F_{P_i}^{Ver}$ (e.g., garbled circuits, pre-computed values, etc.) and a part of a master key $\vec{msk}$ as $msk_i$. One may choose any proper SMPC protocol to realize $F^{Ver}$ defined in FIG. 4 ("Algorithm 2") depending on the performance and security requirements of the application. Note that any SMPC protocol requires parties to interact with each other, and therefore it is recommended that the verification parties are connected to each other and the cloud server via a high-capacity and fast network.

FIG. 7 is an algorithmic diagram and operational flow 700 of an implementation of a SOBAP technique. In the algorithmic diagram and operational flow 700 (also referred to in FIG. 7 as "Algorithm 4"), a setup phase is executed by a dealer (e.g., the dealer 150 or a key generation center) offline (e.g., in an initialization phase). In an implementation, all parties are connected to each other via a secure channel (e.g., a post-quantum secure SSL/TLS, or pre-distribution of symmetric keys via the dealer or key generation center).

At 710, given users (e.g., user computing devices) $(ID_1, \ldots ID_z)$, auditors $(A_1, \ldots A_e)$, and their corresponding access control policy information, the KGC creates AACDS and provides it to the cloud server.

At 720, given the security parameter K, the KGC creates a master key set $\vec{msk} = \{msk_j \leftarrow \{0,1\}^K\}_{j=1}^n$.

At 730, the KGC derives $k_i^1 \leftarrow \text{KDF} \vec{msk}(ID_i)$ and provides it to user $ID_i$ along with function $F^{ID_i}$ for $i=1, \ldots, z$.

At 740, given function $F^{Ver}$, the KGC generates $(\langle F_{P_1}^{Ver}, msk_1 \rangle, \ldots, \langle F_{P_n}^{Ver}, msk_n \rangle)$ and distributes them to the parties (e.g., the verifiers) $(P_1, \ldots, P_n)$, respectively.

At the sender, at 742, the user $ID_i$ cryptographically protects the data collected in time periods $(t_1, \ldots, t_L)$ via function $F^{ID_i}$ as $(\vec{C}_{1,m}, \sigma_{1,m}, k_i^{L+1}) \leftarrow F^{ID_i}(\langle \vec{C}_{1,m-1}, M_m \rangle, \sigma_{1,m-1}, M_m, k_i^L)$, where $M_m$ is the last data set collected in L. The user $ID_i$ uploads $(\vec{C}_{1,m}, \sigma_{1,m})$ to the cloud server.

Regarding audit and verification, at 745, an auditor A requests the verification and/or decryption of cryptographically protected data $(\vec{C}_{1,m}, \sigma_{1,m})$ of user $ID_i$.

At 750, the auditor A sends its request to all verifiers $(P_1, \ldots, P_n)$.

At 760, each verifier $P_i$ accesses AACDS on the cloud server, and cryptographically verifies if the auditor A has the required access rights on the data of user ID. If the auditor A does not have access rights, at least one verifier aborts at 770. Otherwise, at 780, the verifiers execute the distributed verification function $F^{Ver}$ by fetching the cryptographically protected data from the cloud server and communicating with each other as follows: $(b, \vec{M}_{1,m}) \leftarrow \text{SMPC}(\langle F_{P_1}^{Ver}, msk_1 \rangle \ldots \langle F_{P_n}^{Ver}, msk_n \rangle)$. If bit b=0, then the parties inform the auditor A that the data is not authenticated, and they abort; otherwise, the provide $\vec{M}_{1,m}$ to the auditor A over a post-quantum secure channel.

The SOBAP technique may be extended in some implementations.

In some implementations, the cryptographically protected sensitive data and AACDS are stored in a cloud server (e.g., the cloud server 120), which can be accessed by the auditor(s) 130 and the verifier(s) 140. Note that in this setting, access patterns of verifiers, auditors, and users are known to the cloud server.

An alternative is to eliminate the use of a cloud server, and replicate the sensitive data among and AACDS to all parties. In such an implementation, each party just executes the proposed protocol on their own copy. This has the advantage of replicating data (i.e., more robustness against data loss), and also it does not leak access pattern information to the cloud server. On the other hand, it incurs n times more storage than that of the original protocol, and also every party and auditor has to communicate with each other, which incurs more bandwidth consumption. Moreover, the sender must upload data to the n parties separately.

Another alternative is to use a Privacy Enhancing Technology (PET) like an Oblivious Random Access Machine (ORAM) [45]. Each party and auditor can use single-server ORAM to access to the cloud server to fetch the sensitive data obliviously. However, a better approach is to use multi-user ORAM techniques. It is also possible to realize such strategies with multi-server ORAM schemes (e.g., [26]), some of which are also post-quantum secure.

Moreover, given that SMPC can execute any functionality generically, by accepting the proper cost, all logic of accessing and verifying information from AACDS can also be implemented via SMPC with only symmetric primitives. One can use SMPC to realize authentication, integrity, and ORAM functionalities in a fully distributed setting, either the information is being accessed from the central cloud server, or fully split into parties. This can be done to ensure that it will retain post-quantum security of symmetric and ORAM primitives. This approach is significantly costlier than the use of traditional AACDS with digital signatures and Merkle-trees and/or with ORAMs.

Another enhancement may be with secure hardware for identifier parties. SOBAP may be augmented with highly available secure hardware components such as Secure Guard Extension (SGX) [28, 37]. Specifically, enhance the collusion resiliency of SOBAP by placing each verifier logic into a secure enclave [37]. As long as the secure hardware remains unbreached, the verifiers cannot collude and/or inject malicious inputs to SOBAP verification process. At the same time, if the secure hardware is breached (e.g., several practical attacks have been shown to secure hardware [15, 17, 30, 31]), then SOBAP still provides all the security assurances at the cryptographic level. Therefore, the collusion resiliency and malicious input tolerance of SOBAP are improved as long as the secure hardware is intact, and distributed security is ensured against a possible breach in secure hardware. This approach is superior to stand-alone use of secure hardware for cryptographic protection, or stand-alone use of SOBAP without extra hardware protection (given the fact that the cost of commodity secure hardware is little and widely available). Although implementations may use Intel SGX, this is not intended to be limiting, as any other secure hardware is equally applicable, so the solution is not limited to Intel SGX (e.g., [25]). The secure hardware integrated into SOBAP relies on post-quantum secure primitives such as a post-quantum signature, attestation protocol, and key establishment. These can be achieved by replacing classical primitives in secure hardware with the post-quantum versions.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

REFERENCES

[1] Post-quantum cryptography standardization conference, 2018.
[2] M. Abdalla and L. Reyzin. A new forward-secure digital signature scheme. In Advances in Cryptology (ASIA-CRYPT '00), pages 116-129. Springer-Verlag, 2000.
[3] R. Accorsi. Log data as digital evidence: What secure logging protocols have to offer? In International Computer Software and Applications Conference (COMPSAC '09), pages 398-403, 2009.
[4] Shashank Agrawal, Payman Mohassel, Pratyay Mukherjee, and Peter Rindal. Dise: Distributed symmetric-key encryption. IACR Cryptology ePrint Archive, 2018:727, 2018.
[5] Shweta Agrawal and Dan Boneh. Homomorphic macs: Mac-based integrity for network coding. In Proceedings of the 7th International Conference on Applied Cryptography and Network Security, ACNS '09, pages 292-305, Berlin, Heidelberg, 2009. Springer-Verlag.
[6] M. Bellare and P. Rogaway. Random oracles are practical: A paradigm for designing efficient protocols. In Proceedings of the 1st ACM conference on Computer and Communications Security (CCS '93), pages 62-73, NY, USA, 1993. ACM.
[7] M. Bellare and P. Rogaway. Introduction to modern cryptography. In UCSD CSE Course, page 207. 1st edition, 2005. http://www.cs.ucsd.edu/mihir/cse207/class-notes.html.
[8] Mihir Bellare and Chanathip Namprempre. Authenticated encryption: Relations among notions and analysis of the generic composition paradigm. Journal of Cryptology, 21(4):469-491, October 2008.
[9] Daniel J. Bernstein, Johannes Buchmann, and Erik Dahmen. Post Quantum Cryptography. Springer Publishing Company, Incorporated, 1st edition, 2008.
[10] Daniel J. Bernstein, Daira Hopwood, Andreas Htilsing, Tanja Lange, Ruben Niederhagen, Louiza Papachristodoulou, Michael Schneider, Peter Schwabe, and Zooko Wilcox-O'Hearn. Sphincs: Practical stateless hash-based signatures. In Advances in Cryptology—EUROCRYPT 2015: 34th Annual International Conference on the Theory and Applications of Cryptographic Techniques, pages 368-397. Springer Berlin Heidelberg, 2015.
[11] Matthew A. Bishop. The Art and Science of Computer Security. Addison-Wesley Longman Publishing Co., Inc., Boston, Mass., USA, 2002.
[12] Dan Boneh, Ben Lynn, and Hovav Shacham. Short signatures from the weil pairing. In Colin Boyd, editor, Advances in Cryptology—ASIACRYPT 2001, pages 514-532. Springer Berlin Heidelberg, 2001.
[13] J. W. Bos, C. Costello, M. Naehrig, and D. Stebila. Post-quantum key exchange for the tls protocol from the ring learning with errors problem. In 2015 IEEE Symposium on Security and Privacy, pages 553-570, May 2015.
[14] Joppe Bos, Craig Costello, Leo Ducas, Ilya Mironov, Michael Naehrig, Valeria Nikolaenko, Ananth Raghunathan, and Douglas Stebila. Frodo: Take off the ring! practical, quantum-secure key exchange from lwe. In Proceedings of the 2016 ACM SIGSAC Conference on Computer and Communications Security, CCS '16, pages 1006-1018, New York, N.Y., USA, 2016. ACM.
[15] Ferdinand Brasser, Urs Müller, Alexandra Dmitrienko, Kari Kostiainen, Srdjan Capkun, and Ahmad-Reza Sadeghi. Software Grand Exposure: SGX Cache Attacks Are Practical.
[16] Johannes Buchmann, Erik Dahmen, and Andreas Hülsing. Xmss—a practical forward secure signature scheme based on minimal security assumptions. In Proceedings of the 4th International Conference on Post-Quantum Cryptography, PQCrypto'11, pages 117-129, Berlin, Heidelberg, 2011. Springer-Verlag.
[17] Jo Van Bulck, Nico Weichbrodt, R. Kapitza, Frank Piessens, and Raoul Strackx. Telling Your Secrets without Page Faults: Stealthy Page Table-Based Attacks on Enclaved Execution. In USENIX Security, 2017.
[18] Lily Chen. Nist special publication 800-108: Recommendation for key derivation using pseudorandom functions (revised). Technical Report NIST-SP800-108, National Institute of Standards and Technology. Computer Security Division, October 2009. Available at http://csrc.nist.gov/publications/nistpubs/800-108/sp800-108.pdf.
[19] C. N. Chong and Z. Peng. Secure audit logging with tamper-resistant hardware. In Proceedings of the 18th IFIP International Information Security Conference, pages 73-84. Kluwer Academic Publishers, 2003.
[20] Ronald Cramer, Ivan Bjerre Damgrd, and Jesper Buus Nielsen. Secure Multiparty Computation and Secret Sharing. Cambridge University Press, New York, N.Y., USA, 1st edition, 2015.
[21] E. Cronin, S. Jamin, T. Malkin, and P. McDaniel. On the performance, feasibility, and use of forward-secure signatures. In Proceedings of the 10th ACM Conference on Computer and Communications Security (CCS '03), pages 131-144. ACM, 2003.
[22] S. Crosby and D. S. Wallach. Efficient data structures for tamper evident logging. In Proceedings of the 18th conference on USENIX Security Symposium, August 2009.

[23] D. Davis, F. Monrose, and M. Reiter. Time-scoped searching of encrypted audit logs. In Proc. of the 6th International Conference on Information and Communications Security (ICICS '04), pages 532-545, 2004.

[24] Mohammad Etemad and Alptekin Küpçü. Database outsourcing with hierarchical authenticated data structures. In Information Security and Cryptology—ICISC 2013, Lecture Notes in Computer Science, pages 381-399. Springer International Publishing, 2014.

[25] Christopher W Fletcher, Marten van Dijk, and Srinivas Devadas. A secure processor architecture for encrypted computation on untrusted programs. In Proceedings of the seventh ACM workshop on Scalable trusted computing, pages 3-8. ACM, 2012.

[26] Thang Hoang, Ceyhun D. Ozkaptan, Attila A. Yavuz, Jorge Guajardo, and Tam Nguyen. $S^3$oram: A computation-efficient and constant client bandwidth blowup ORAM with shamir secret sharing. In Proceedings of the 2017 ACM SIGSAC Conference on Computer and Communications Security, CCS 2017, Dallas, Tex., USA, Oct. 30-Nov. 3, 2017, pages 491-505, 2017.

[27] J. E. Holt. Logcrypt: Forward security and public verification for secure audit logs. In Proc. of the 4th Australasian workshops on Grid computing and e-research (ACSW '06), pages 203-211, 2006.

[28] Intel Corporation. Intel Software Guard Extensions Programming Reference (rev2), October 2014. 329298-002US.

[29] M. Jakobsson. Fractal hash sequence representation and traversal. In Proceedings of the 2002 IEEE International Symposium on Information Theory (ISIT '02), pages 437-444. IEEE, 2002.

[30] Jaehyuk Lee, Jinsoo Jang, Yeongjin Jang, Nohyun Kwak, Yeseul Choi, Changho Choi, Taesoo Kim, Marcus Peinado, and Brent B Kang. Hacking in darkness: Return-oriented programming against secure enclaves. In USENIX Security, pages 523-539, 2017.

[31] Sangho Lee, Ming-Wei Shih, Prasun Gera, Taesoo Kim, Hyesoon Kim, and Marcus Peinado. Inferring Fine-grained Control Flow Inside SGX Enclaves with Branch Shadowing. In USENIX Security, 2017.

[32] Vadim Lyubashevsky. Lattice signatures without trapdoors. In David Pointcheval and Thomas Johansson, editors, Advances in Cryptology—EUROCRYPT 2012, pages 738-755, Berlin, Heidelberg, 2012. Springer Berlin Heidelberg.

[33] D. Ma. Practical forward secure sequential aggregate signatures. In Proceedings of the 3rd ACM symposium on Information, Computer and Communications Security (ASIACCS '08), pages 341-352, NY, USA, 2008. ACM.

[34] D. Ma and G. Tsudik. Forward-secure sequential aggregate authentication. In Proceedings of the 28th IEEE Symposium on Security and Privacy (S&P '07), pages 86-91, May 2007.

[35] D. Ma and G. Tsudik. A new approach to secure logging. In Proc. of the 22nd Annual IFIP WG 11.3 Working Conference on Data and Applications Security (DBSEC '08), pages 48-63, 2008.

[36] D. Ma and G. Tsudik. A new approach to secure logging. ACM Transaction on Storage (TOS), 5(1):1-21, 2009.

[37] Frank McKeen, Ilya Alexandrovich, Ittai Anati, Dror Caspi, Simon Johnson, Rebekah Leslie-Hurd, and Carlos Rozas. Intel® software guard extensions (Intel® sgx) support for dynamic memory management inside an enclave. In Proceedings of the Hardware and Architectural Support for Security and Privacy 2016, page 10. ACM, 2016.

[38] A. J. Menezes, P. C. van Oorschot, and S. A. Vanstone. Handbook of Applied Cryptography. CRC Press, 1996. ISBN: 0-8493-8523-7.

[39] R. Merkle. Protocols for public key cryptosystems. In Proceedings of the IEEE Symposium on Research in Security and Privacy, April 1980.

[40] Moni Naor, Benny Pinkas, and Omer Reingold. Distributed pseudo-random functions and kdcs. In Jacques Stern, editor, Advances in Cryptology—EUROCRYPT '99, pages 327-346, Berlin, Heidelberg, 1999. Springer Berlin Heidelberg.

[41] NIST. Announcing the advanced encryption standard (AES). FIPS 197, November 2001.

[42] National Institute of Standard Technologies (NIST). Submission requirements and evaluation criteria for the post-quantum cryptography standardization process. https://csrc.nist.gov/csrc/media/projects/post-quantum-cryptography/documents/call-for-proposals-_nal-dec-2016.pdf, 2017. Accessed: Oct. 11, 2017.

[43] B. Schneier and J. Kelsey. Cryptographic support for secure logs on untrusted machines. In Proc. of the 7th conference on USENIX Security Symposium. USENIX Association, 1998.

[44] B. Schneier and J. Kelsey. Secure audit logs to support computer forensics. ACM Transaction on Information System Security, 2(2):159-176, 1999.

[45] Emil Stefanov, Elaine Shi, and Dawn Xiaodong Song. Towards practical oblivious ram. In 19th Annual Network and Distributed System Security Symposium (NDSS).

[46] A. A. Yavuz and P. Ning. BAF: An efficient publicly verifiable secure audit logging scheme for distributed systems. In Proceedings of 25th Annual Computer Security Applications Conference (ACSAC '09), pages 219-228, 2009.

[47] A. A. Yavuz and P. Ning. Self-sustaining, efficient and forward-secure cryptographic constructions for unattended wireless sensor networks. Ad Hoc Networks, 10(7):1204-1220, 2012.

[48] A. A. Yavuz, Peng Ning, and Michael K. Reiter. BAF and FI-BAF: Efficient and publicly verifiable cryptographic schemes for secure logging in resource constrained systems. ACM Transaction on Information System Security, 15(2), 2012.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

What is claimed is:

1. A method comprising:
   receiving, at a first verifier, a request from an auditor for data stored in a storage;
   accessing, by the first verifier, an authenticated access control data structure (AACDS);
   cryptographically verifying, by the first verifier using the AACDS, whether the auditor has access rights to the data, wherein the cryptographically verifying comprises executing a symmetric primitive with a secure multi-party computation (SMPC) technique, wherein the symmetric primitive has extended features comprising at least one of compromise-resiliency, aggregation, all-or-nothing primitives, or authenticated encryption in a distributed setting;

fetching, by the first verifier, the data from the storage using a verifier function when the auditor has been cryptographically verified to have access rights to the data; and providing, by the first verifier, the data to the auditor over a post-quantum secure channel.

2. The method of claim 1, further comprising receiving, at a second verifier, the request from the auditor for data stored in a storage;

accessing, by the second verifier, the authenticated access control data structure (AACDS);

cryptographically verifying, by the second verifier using the AACDS, whether the auditor has access rights to the data;

fetching, by the first verifier and the second verifier, the data from the storage using the verifier function when the auditor has been cryptographically verified by the first verifier and the second verifier to have access rights to the data; and providing, by the first verifier and the second verifier, the data to the auditor over the post-quantum secure channel.

3. The method of claim 2, wherein the data in the data storage is cryptographically protected.

4. The method of claim 2, wherein the data storage resides in a cloud server.

5. The method of claim 4, wherein the AACDS resides in the cloud server.

6. The method of claim 2, wherein the verifier function is a distributed verifier function.

7. The method of claim 2, further comprising the first verifier and the second verifier aborting providing the data to the auditor when at least one of the first verifier or the second verifier cannot cryptographically verify the auditor.

8. The method of claim 1, wherein cryptographically verifying whether the auditor has access rights to the data comprises:

determining a symmetric key of a user that provided the data for storage; and verifying an authentication tag of the user using the symmetric key and a master key.

9. The method of claim 8, wherein the authentication tag is encrypted via a symmetric function with forward-secure and all-or-nothing features.

10. A system comprising:

an auditor stored in a memory and executable by a processor; and at least one verifier stored in the memory and when executed by the processor:

receives a request from the auditor for data stored in a data storage;

accesses an authenticated access control data structure (AACDS);

cryptographically verifies, using the AACDS, whether the auditor has access rights to the data, wherein the cryptographically verifying comprises executing a symmetric primitive with a secure multi-party computation (SMPC) technique, wherein the symmetric primitive has extended features comprising at least one of compromise-resiliency, aggregation, all-or-nothing primitives, or authenticated encryption in a distributed setting;

fetches the data from the data storage using a verifier function when the auditor has been cryptographically verified to have access rights to the data; and provides the data to the auditor over a post-quantum secure channel.

11. The system of claim 10, wherein the at least one verifier comprises a plurality of verifiers, and wherein the verifier function is a distributed verifier function.

12. The system of claim 11, wherein the data storage resides in a cloud server and wherein the data is cryptographically protected.

13. The system of claim 12, wherein the AACDS resides in the cloud server.

14. The system of claim 11, wherein the plurality of verifiers are configured to abort providing the data to the auditor when at least one of the plurality of verifiers cannot cryptographically verify the auditor.

15. The system of claim 10, further comprising at least one user computing device that encrypts the data and uploads the encrypted data to the data storage.

16. A method comprising:

receiving, at each of a plurality of verifiers, a request from an auditor for cryptographically stored data of a user;

accessing, by each of the plurality of verifiers, an authenticated access control data structure (AACDS);

determining, by each of the plurality of verifiers using the AACDS, whether the auditor has access rights to the data, wherein the determining comprises executing a symmetric primitive with a secure multi-party computation (SMPC) technique, wherein the symmetric primitive has extended features comprising at least one of compromise-resiliency, aggregation, all-or-nothing primitives, or authenticated encryption in a distributed setting;

denying the request when at least one of the plurality of verifiers determines that the auditor does not have the access rights to the cryptographically stored data; and fetching, by each of the plurality of verifiers, the cryptographically stored data using a distributed verifier function, and providing, by each of the plurality of verifiers, the cryptographically stored data to the auditor over a post-quantum secure channel, when the auditor has been determined to have the access rights to the cryptographically stored data.

17. The method of claim 16, wherein the request from the auditor comprises a request for at least one of verification or decryption of the cryptographically stored data.

18. The method of claim 16, further comprising generating the AACDS, by a key generation center, using an identifier of the user, the auditor, and access control policy information, and providing the AACDS to a cloud server for storage.

19. The method of claim 18, further comprising the user cryptographically protecting data and storing the cryptographically protected data to the cloud server to create the cryptographically stored data.

20. The method of claim 18, further comprising the user collecting data during a plurality of time periods, encrypting the data, computing an authentication tag for the data via a symmetric function with forward-secure and all-or-nothing features, and uploading the encrypted data and authentication tag to the cloud server as the cryptographically stored data.

* * * * *